United States Patent
Schimel

(10) Patent No.: US 7,729,135 B1
(45) Date of Patent: Jun. 1, 2010

(54) POWER CONVERTER USING A SINGLE TAPPED TRANSFORMER FOR MULTIPLE RANGES OF INPUT VOLTAGE

(75) Inventor: Paul L. Schimel, Alqonquin, IL (US)

(73) Assignee: Fairchild Semiconductor Corporation, South Portland, ME (US)

(*) Notice: Subject to any disclaimer, the term of this patent is extended or adjusted under 35 U.S.C. 154(b) by 415 days.

(21) Appl. No.: 11/801,642

(22) Filed: May 10, 2007

(51) Int. Cl.
H02M 3/335 (2006.01)
(52) U.S. Cl. .................................................. 363/21.01
(58) Field of Classification Search ............... 363/21.12, 363/21.15, 21.2
See application file for complete search history.

(56) References Cited

U.S. PATENT DOCUMENTS

| | | | | |
|---|---|---|---|---|
| 5,449,991 A | * | 9/1995 | Owen | 318/500 |
| 5,862,044 A | * | 1/1999 | Shioya et al. | 363/21.07 |
| 6,646,894 B2 | * | 11/2003 | Hong et al. | 363/21.01 |
| 6,693,803 B2 | * | 2/2004 | Beranger et al. | 363/21.07 |
| 7,133,298 B2 | * | 11/2006 | Schimel | 363/15 |
| 7,212,415 B2 | * | 5/2007 | Osaka | 363/21.02 |
| 7,339,799 B2 | * | 3/2008 | Osaka et al. | 363/17 |
| 7,468,896 B2 | * | 12/2008 | Gong et al. | 363/21.17 |
| 7,541,751 B2 | * | 6/2009 | Vaziri | 315/307 |

* cited by examiner

*Primary Examiner*—Adolf Berhane
*Assistant Examiner*—Yemane Mehari
(74) *Attorney, Agent, or Firm*—Sidley Austin LLP

(57) ABSTRACT

In one embodiment, a power converter system includes an input terminal for an input voltage. A transformer, coupled to the input terminal, has a primary winding and a secondary winding. An output terminal is coupled to the secondary winding. Power is delivered to a load of the power converter system at the output terminal. A first control module, coupled through a relay to a tap terminal to the primary winding of the transformer, operates the power converter system if a magnitude of the input voltage is within a low voltage range. A second control module, coupled at an end terminal of the primary winding of the transformer, operates the power converter system if a magnitude of the input voltage is within a high voltage range.

33 Claims, 4 Drawing Sheets

POWER CONVERTER USING A SINGLE TAPPED TRANSFORMER FOR MULTIPLE RANGES OF INPUT VOLTAGE

BACKGROUND

1. Field of Invention

The present invention relates to power converters, and more particularly to, a power converter using a single, tapped transformer for multiple ranges of input voltage.

2. Description of Related Art

Power converters are essential for many modern electronic devices. Among other capabilities, power converters can adjust voltage level downward (buck converter) or adjust voltage level upward (boost converter). Power converters may also convert from alternating current (AC) power to direct current (DC) power, or vice versa. Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." The power converters may also include one or more capacitors or inductors for alternately storing and outputting energy.

In some applications, there may be a multiple ranges of input voltages (i.e., high voltage and low voltage) for a power converter. This may be the case, for example, in some consumer electronic equipment which can be powered from wall outlets (i.e., AC mains voltages) or powered by automotive voltages. According to previously developed techniques, two completely separate power systems—each having its own transformer, controller, and switching elements—were provided for such applications in order to accommodate the multiple (e.g., dual) ranges of input voltages. This increases the costs for implementing the power conversion functionality and requires additional space in the electronic equipment, which can be a premium for some especially small and portable devices.

SUMMARY

According to an embodiment of the present invention, a power converter system includes an input terminal for an input voltage. A transformer, coupled to the input terminal, has a primary winding and a secondary winding. An output terminal is coupled to the secondary winding. Power is delivered to a load of the power converter system at the output terminal. A first switching device, coupled at an end terminal of the primary winding, is operable to be turned on and off to cause current to flow through the primary winding. A second switching device, coupled through a relay to a tap terminal of the primary winding of the transformer, is operable to be turned on and off to cause current to flow through the primary winding. A first controller controls the first switching device when the input voltage has a magnitude within a high voltage range. A second controller controls the second switching device when the input voltage has a magnitude within a low voltage range.

According to another embodiment of the present invention, a method is provided for a power converter system having a single transformer with a primary winding and a secondary winding. The method includes: receiving an input voltage; if a magnitude of the input voltage is within a low voltage range, operating the power converter system with a first control module coupled at a tap terminal to the primary winding of the transformer; and if a magnitude of the input voltage is within a high voltage range, operating the power converter system with a second control module coupled at an end terminal of the primary winding of the transformer.

According to yet another embodiment of the present invention, a power converter system includes an input terminal for an input voltage. A transformer, coupled to the input terminal, has a primary winding and a secondary winding. An output terminal is coupled to the secondary winding. Power is delivered to a load of the power converter system at the output terminal. A first control module, coupled through a relay to a tap terminal to the primary winding of the transformer, operates the power converter system if a magnitude of the input voltage is within a low voltage range. A second control module, coupled at an end terminal of the primary winding of the transformer, operates the power converter system if a magnitude of the input voltage is within a high voltage range.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Figure 1:
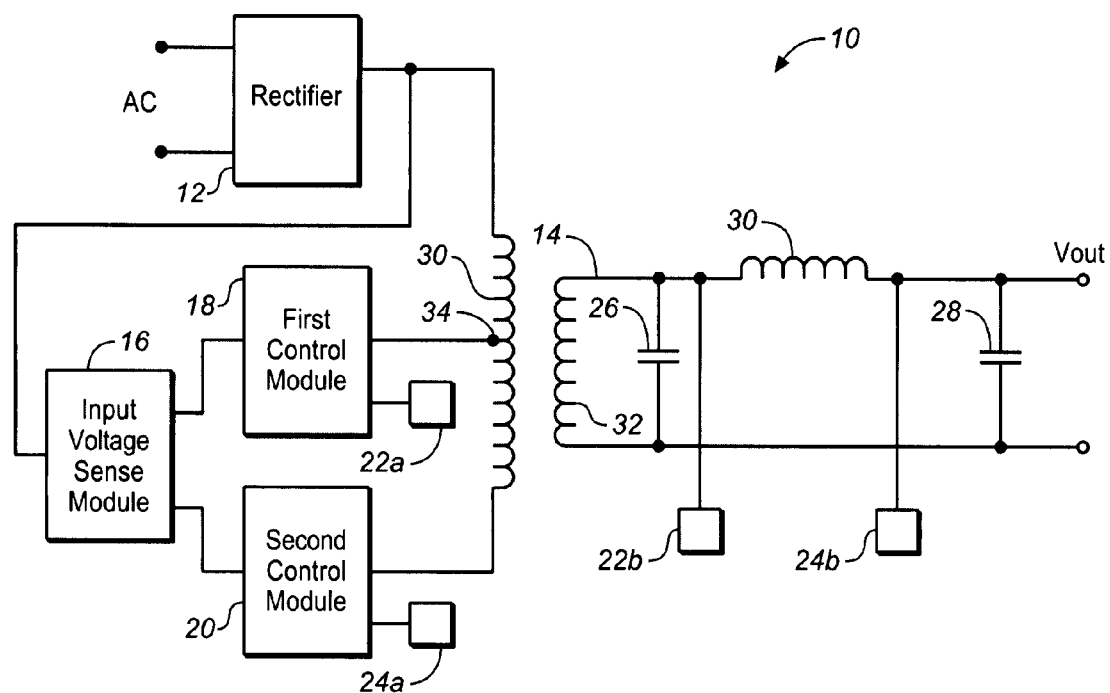
FIG. 1 is a schematic block diagram of a power converter system using a single, tapped transformer to accommodate a range of input voltages, according to an embodiment of the invention.
Figures 2, 2A:
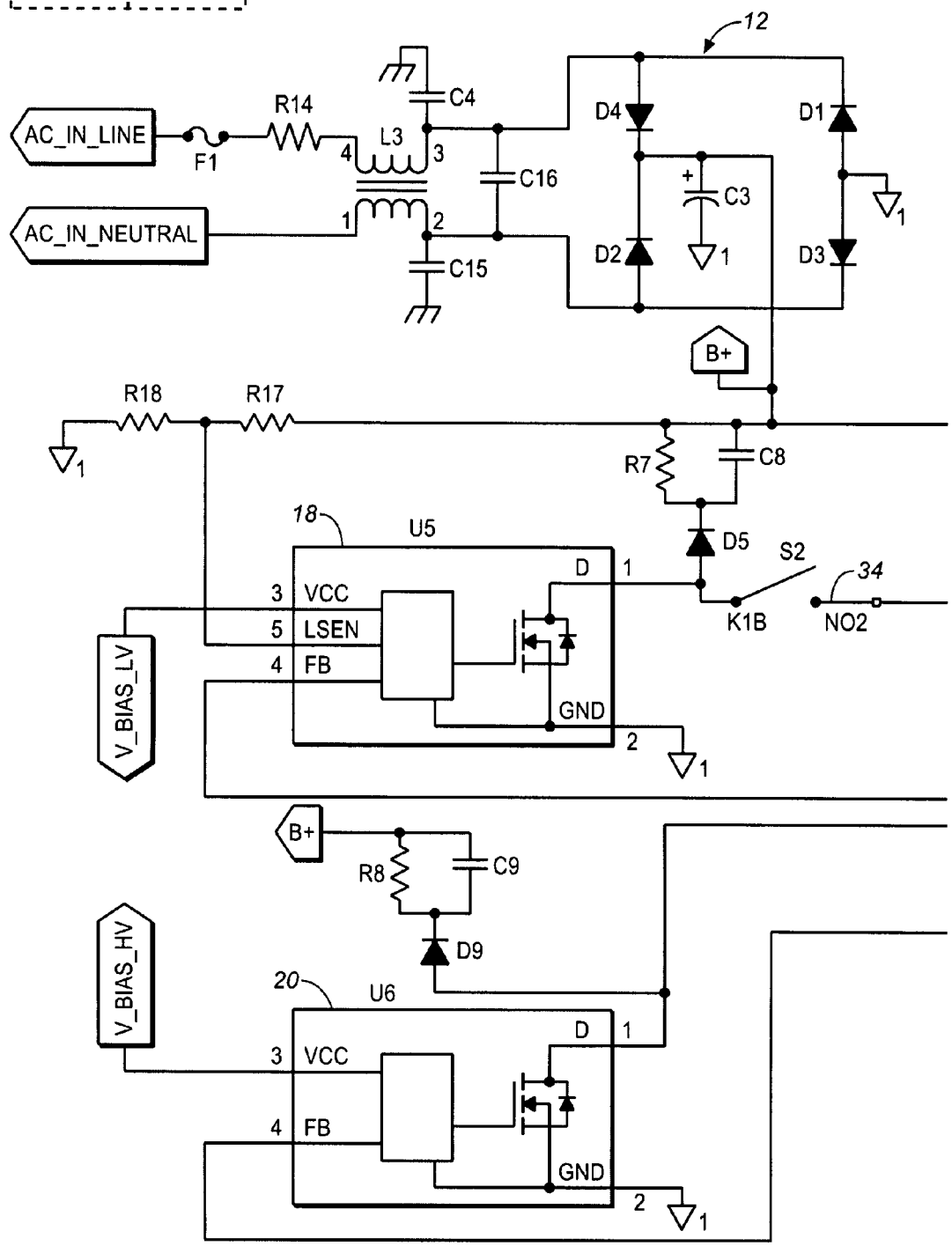
FIG. 2 is a schematic diagram of an exemplary implementation of the power converter system, according to an embodiment of the invention.
Figure 2B:
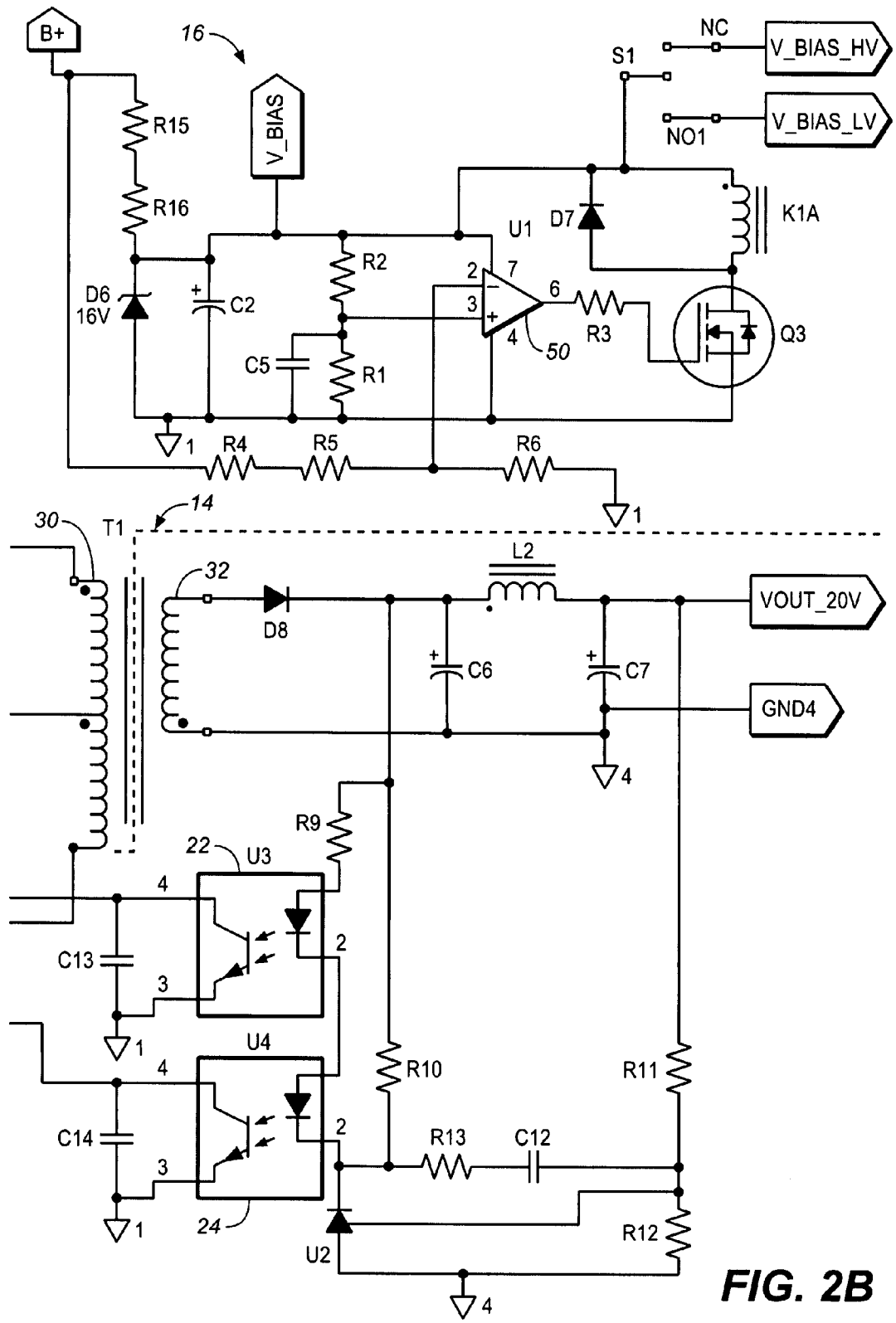
Figure 3:
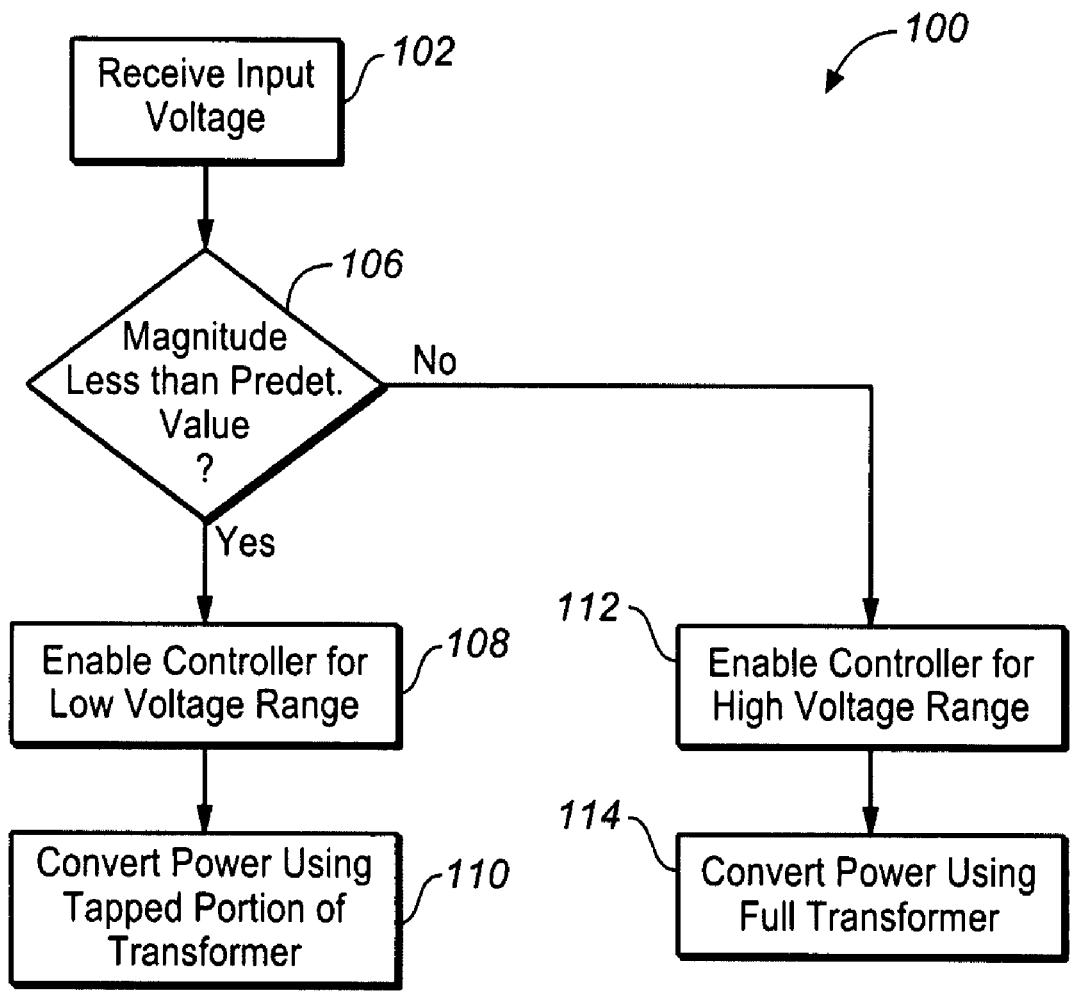
FIG. 3 is a flow diagram of exemplary method for operating a power converter system with a single, tapped transformer to accommodate a range of input voltages, according to an embodiment of the invention.

Embodiments of the present invention and their advantages are best understood by referring to FIGS. 1 through 3 of the drawings. Like numerals are used for like and corresponding parts of the various drawings.

In various embodiments, the present invention provides systems, circuitry, and methods that allow the use of one transformer for different ranges of input voltage for a power converter system, such as, for example, in an application for a thermostat (which can have a low voltage range from 18 to 36 VAC and a high voltage range from 85 to 265 VAC). In some embodiments, multiple controllers and switches (e.g., transistors) are provided—one controller and switch for each range of input voltages. Each controller and switch combination is connected to the single transformer, with at least one of the controller and switch combinations switched in at a tap terminal of the transformer. The systems, circuitry, and methods may select one controller and switch combination or another to control current flow through the transformer. Any controller and switch combination that is not selected may appear as an open circuit. An advantage of embodiments of the invention is a smaller, more cost-effective power supply.

FIG. 1 is a schematic block diagram of a power converter system 10 using a single, tapped transformer to accommodate a range of input voltages, according to an embodiment of the invention. Power converter system 10 can be incorporated in or used with any electronic device which may have different input voltage ranges, such as, for example, electronic devices which can be run from AC mains voltages (e.g., wall outlets) or by automotive voltages. In this embodiment, power converter system 10 is a switching regulator and, more particularly, a flyback converter operating in Discontinuous Conduction Mode (DCM). In one embodiment, power converter system 10 can be an AC-to-DC converter. As depicted, power converter system 10 receives an AC input voltage and provides power to a load at an output terminal Vout. In other embodiments, power converter system 10 can be a DC regulator. Upon reading this disclosure, a skilled artisan can understand how to implement the present invention without undue experimentation.

As shown, the power converter system 10 includes a rectifier 12, a transformer 14, an input voltage sensing module 16, a first control module 18, a second control module 20, a first optocoupler 22 (having parts 22a, 22b), a second optocoupler 24 (having parts 24a, 24b), capacitors 26, 28, and an inductor 30.

The rectifier 12 rectifies the AC input voltage to create a DC line voltage. In one embodiment, the rectifier 12 can be implemented with a plurality of diodes, as understood by one of ordinary skill in the art. The transformer 14 includes a primary winding 30 and a secondary winding 32. The primary winding 30 is connected to the DC line voltage at one end. As used herein, the terms or "connected" or "coupled," or any variant thereof, covers any connection or coupling, either direct or indirect, between two or more elements. The primary winding 30 is tapped at a tap terminal 34. Current flow through the primary winding 30 causes energy to be stored in the transformer 14 and transferred to secondary winding 32. Current flows from the secondary winding 32 into the capacitor 26, then through the inductor 30 to capacitor 28, which filters and smooths the rectified current pulses to form a substantially direct current output voltage Vout at the output terminal. The ratio of turns in the windings 30 and 32 of transformer 14 may be adjusted to either increase or decrease the voltage associated with the AC mains power source and the output voltage (Vout) as needed for a particular application.

First control module 18 is connected to primary winding 30 of transformer 14 at the tap terminal 34, and second control module 20 is connected to the primary winding 30 at the end opposite the DC line voltage. First control module 18 and second control module 20 each functions to cause current to flow through primary winding 30. First control module 18 and second control module 20 are used in the alternative. In one embodiment, first control module 18 is used to control current flow when the magnitude of the input voltage falls within a low voltage range (e.g., 18 to 36 VAC), and the second control module 20 is used to control current flow when the magnitude of the input voltage falls within a high voltage range from (e.g., 85 to 265 VAC). In one embodiment, each of first control module 18 and second control module 20 includes a switching device (e.g., a metal-oxide-semiconductor field effect transistor (MOSFET), an IGBT, a MOS-gated thyristor, or other suitable power device) and controller. When used, the controller in first or second control module 18 or 20 provides a control signal for turning on and off the respective switching device.

Because first control module 18 is tap-connected to the primary winding 30, current flows through less turns of the primary winding 30 when first control module 18 is used as compared to when second control module 20 is used. As such, for a given input voltage, the magnitude of current flowing in the secondary winding 32 of transformer 14 when first control module 18 is operating will be less than that caused by second control module 20.

Each control module 18 and 20 receives a respective control signal from input voltage sense module 16. First control module 18 receives a feedback signal from a feedback network that includes optocoupler 22. Second control module 20 receives a feedback signal from a feedback network that includes optocoupler 24. The respective feedback signals are used in controlling the switching devices of first and second control modules 18 and 20 for output voltage regulation.

The primary inductances of the transformer 14 vary as the square of the turns ratio. The lower voltage converter configuration (formed with the first control module 18 connected at the tap terminal 34 of transformer 14) has less primary turns and hence far less primary inductance than the high voltage converter configuration (formed with the second control module 20 connected at the end of transformer 14). This makes the use of a higher frequency converter more practical at low voltages, where the switching losses and parasitics are more advantageous. In one embodiment, if the first and second control modules 18 and 20 are implemented with fixed frequency controllers, the critical inductance value for the low voltage converter configuration will dominate the design, thereby causing slightly higher than normal peak currents in the high voltage converter configuration. In other embodiments, variable frequency controllers can be used for the first and second control modules 18 and 20. By having variable frequency controllers, the required inductance value for DCM operation can be shifted to match the values yielded by the turns ratio of the transformer 14.

Although only two control modules are illustrated in FIG. 1, it should be realized that in other embodiments additional control modules may be provided (and connected at various respective tap terminals to primary winding 30) to handle either a greater range of input voltages or to provide control in finer (i.e., smaller) incremental ranges.

Input voltage sensing module 16, which is coupled to the DC line voltage, can sense or determine the magnitude of the input voltage. Input voltage sensing module 16 generates control signals for selecting either first control module 18 or second control module 20 for use to control current flow in primary winding 30, depending on the magnitude of the input voltage. In one embodiment, input voltage sensing module 16 can be implemented with analog circuitry including, for example, a comparator. In another embodiment, input voltage sensing module 16 can be implemented in digital form, for example, with a microcontroller (which replaces the comparator of the analog implementation and may add hysteresis, timing, and lockout functions).

In various embodiments, all or a portion of power converter system 10 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween. In one embodiment, for example, each of input voltage sense module 16, low input voltage control module 18, and high input voltage control module 20 are implemented on its own, separate chip or die, and the remaining elements of power converter system 10 are implemented as discrete components.

With embodiments of the present invention, a power converter system capable of accommodating dual ranges of input power supply (e.g., high voltage and low voltage) can be implemented with a single transformer and two controller parts. Such a power converter system is useful for consumer electronics equipment where the equipment is either run on automotive voltages or AC mains voltages. The power converter system according to embodiments of the present invention thus provides an advantage in both size and cost compared to previously developed designs, which required two separate (mutually exclusive) transformers and two separate controllers.

Also, the use of two separate feedback loops (implemented with respective optocouplers 22 and 24) provides another advantage. The feedback signal which is not needed by the selected control module 18 or 20 is not used. This allows for two different compensation schemes for the same output voltage.

FIG. 2 is a schematic diagram of an exemplary implementation of the power converter system 10, according to an embodiment of the invention. Power converter system 10 can be incorporated in or used with any electronic device which may have different input voltage ranges, such as, for example, electronic devices which can be run from AC mains voltages (e.g., wall outlets) or by automotive voltages.

In this implementation, power rectifier 12 includes an electromagnetic interference (EMI) filter (e.g., comprising a network of one or more resistors, capacitors, and/or inductors) for filtering out EMI in the received input voltage. The rectifier 12, coupled to the EMI filter, is implemented with four diodes connected in a full-bridge arrangement. In an application which is run from a DC bus or link, the rectifier 12 is not used or necessary.

The input voltage sensing module 16 senses or determines the magnitude of the input voltage, and generates control signals (V_BIAS_LV and V_BIAS_HV) for selecting either the first control module 18 or the second control module 20 in response. Specifically, if the magnitude of the input voltage falls within a low voltage range (e.g., 18 to 36 VAC), input voltage sensing module 16 outputs a value for control signal (V_BIAS_LV) for selecting first control module 18. Conversely, if the magnitude of the input voltage falls within a high voltage range (e.g., 85 to 265 VAC), input voltage sensing module 16 outputs a value for control signal (V_BIAS_HV) for selecting second control module 20. In one embodiment, a default condition for input voltage sensing module 16 is to select the higher voltage controller (e.g., second control module 20) in order to avoid overstressing the lower voltage controller (e.g., first control module 18), which may not be capable of withstanding the voltage levels handled by the higher voltage controller.

As depicted, input voltage sensing module 16 may be implemented as an analog relay circuit having a comparator 50. An input voltage with a magnitude in the low voltage range (e.g., 18 to 36 VAC) trips the comparator 50, thus pulling down the relay and causing input voltage sensing module 16 to output a value for control signal V_BIAS_LV for selecting first control module 18 and connecting first control module 18 to the transformer tap. Otherwise, input voltage sensing module 16 outputs a value for control signal V_BIAS_HV for selecting second control module 20.

In an alternate embodiment, input voltage sensing module 16 may be implemented in digital form using a suitable microcontroller having one or more digital-to-analog converters (DACs), analog-to-digital converters (ADCs) for better timing, etc.

First control module 18 is connected at a tap of the primary winding 30 of transformer 14. First control module 18 is used to control current flow through primary winding 30 when the magnitude of the input voltage falls within a low voltage range (e.g., 18 to 36 VAC). First control module 18 comprises a power switching device (e.g., MOSFET, an IGBT, a MOS-gated thyristor, or other suitable power device) and a controller for the same. In one embodiment, first control module 18 can be implemented with an integrated circuit (IC) controller and switching device (e.g., an integrated power MOSFET). When first control module 18 is selected, the controller applies signals to turn on and off the switching device and connects the controller to the transformer tap, which causes current to flow from the DC link end of the primary winding out through the tap terminal 34.

First control module 18 receives and is activated by the control signal V_BIAS_LV from input voltage sensing module 16. In one embodiment, as shown, the control signal V_BIAS_LV is applied to the VCC input terminal of the first control module 18. When the first control module 18 is to be selected, the magnitude of the V_BIAS_LV control signal is sufficiently high to power first control module 18—e.g., the V_BIAS_LV control signal has a magnitude which exceeds the undervoltage lockout (UVLO) threshold for first control module 18. When the first control module 18 is not selected, the control module 18 appears as an open circuit.

Second control module 20 is connected at an end of the primary winding 30 opposite the DC bus or link. Second control module 20 is used to control current flow through primary winding 30 when the magnitude of the input voltage falls within a high voltage range from (e.g., 85 to 265 VAC). Like first control module 18, second control module 20 comprises a power switching device (e.g., MOSFET, an IGBT, a MOS-gated thyristor, or other suitable power device) and a controller for the same. In one embodiment, second control module 20 can be implemented with an integrated circuit (IC) controller and switching device (e.g., an integrated power MOSFET. When second control module 20 is selected, the controller applies signals to turn on and off the switching device, which causes current to flow through the primary winding 30 from one end to the other.

Second control module 20 receives and is activated by the control signal V_BIAS_HV from input voltage sensing module 16. In one embodiment, as shown, the control signal V_BIAS_HV is applied to the VCC input terminal of the second control module 20. When the second control module 20 is to be selected, the magnitude of the V_BIAS_HV control signal is sufficiently high to power second control module 20—e.g., the V_BIAS_HV control signal has a magnitude which exceeds the undervoltage lockout (UVLO) threshold for second control module 20. When the second control module 20 is not selected, the control module 20 appears as an open circuit.

As described herein, embodiments of the present invention provide a power converter system which utilizes a single tapped primary transformer and two integrated controller (and respective switching devices) to accommodate two input voltage ranges (e.g., low voltage input and high voltage input). This provides a large reduction in cost compared to approaches (according previously developed techniques) which utilize dual power converter systems, each having its own separate transformers. Not only is there one less transformer for embodiments of the present invention, but there is also substantially less ancillary circuitry.

FIG. 3 is a flow diagram of exemplary method 100 for operating a power converter system with a single, tapped transformer to accommodate a range of input voltages, according to an embodiment of the invention. In one embodiment, this method 100 may be performed in or implemented by the power converter system 10 (shown and described in FIG. 1). Such power converter system 10 can receive an input voltage in different voltage ranges, such as, for example, a low voltage range from 18 to 36 VAC and a high voltage range from 85 to 265 VAC. This may be the case for electronic devices which can be powered with IAC mains voltages (e.g., wall outlets) or by automotive voltages.

At block 102 in method 100, the power converter system 10 receives the input voltage. In some embodiments, the input voltage may be an AC voltage, in which case it is rectified. At block 106, the input voltage sensing module 16 compares the magnitude of the input voltage against a predetermined value. This can be accomplished, for example, using a comparator in an analog implementation for input voltage sensing module 16.

If it is determined at block 106 that the magnitude of the input voltage is less than the predetermined value, then the input voltage falls within the low voltage range. In this situation, input voltage sensing module 16 outputs a control signal to select or enable the first control module 18 at block 108. The first control module 18, which operates for the low voltage range, comprises a controller and a switching device connected at a tap terminal of the primary winding 30 of transformer 14. At block 110, the power converter system 10 converts power with the first control module 18 using the tapped portion of transformer 14.

Conversely, if it is determined at block 106 that the magnitude of the input voltage is greater than the predetermined value, then the input voltage falls within the high voltage range. In this situation, input voltage sensing module 16 outputs a control signal to select or enable the second control module 20 at block 112. The second control module 20, which operates for the high voltage range, comprises a controller and a switching device connected at the end of the primary winding 30 of transformer 14. At block 114, the power converter system 10 converts power with the second control module 20 using the full transformer 14.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power converter system comprising:
an input terminal for an input voltage;
a transformer coupled to the input terminal, the transformer having a primary winding and a secondary winding;
an output terminal coupled to the secondary winding at which power is delivered to a load of the power converter system;
a first switching device coupled at an end terminal of the primary winding and operable to be turned on and off to cause current to flow through the primary winding;
a second switching device coupled through a relay to a tap terminal of the primary winding of the transformer and operable to be turned on and off to cause current to flow through the primary winding;
a first controller for controlling the first switching device when the input voltage has a magnitude within a high voltage range; and
a second controller for controlling the second switching device when the input voltage has a magnitude within a low voltage range.

2. The power converter system of claim 1 comprising an input voltage sensing module for determining if the magnitude of the input voltage is within the high voltage range or the low voltage range.

3. The power converter system of claim 1 comprising an input voltage sensing module operable to output at least one control signal for selecting the first controller or the second controller.

4. The power converter system of claim 1 wherein at least one of the first controller and the second controller is implemented on an integrated circuit device.

5. The power converter system of claim 1 wherein the first controller is implemented on a first integrated circuit device and the second controller is implemented on a second integrated circuit device.

6. The power converter system of claim 1 wherein the input voltage is an AC voltage.

7. The power converter system of claim 1 comprising:
a first feedback loop for providing a first feedback signal to the first controller; and
a second feedback loop for providing a second feedback signal to the second controller.

8. The power converter system of claim 1 wherein the input voltage can be an AC mains voltage or an automotive voltage.

9. The power converter system of claim 3 wherein the input voltage sensing module comprises a microcontroller.

10. The power converter system of claim 3 wherein the input voltage sensing module comprises a comparator for comparing the magnitude of the input voltage against a predetermined value.

11. The power converter system of claim 5 wherein the first switching device is implemented on the first integrated circuit device and the second switching device is implemented on the second integrated circuit device.

12. The power converter system of claim 6 comprising a rectifier circuit for rectifying the AC voltage to provide a DC line voltage.

13. A method for a power converter system having a single transformer with a primary winding and a secondary winding, the method comprising:
receiving an input voltage;
if a magnitude of the input voltage is within a low voltage range, operating the power converter system with a first control module coupled at a tap terminal to the primary winding of the transformer; and
if a magnitude of the input voltage is within a high voltage range, operating the power converter system with a second control module coupled at an end terminal of the primary winding of the transformer.

14. The method of claim 13 wherein:
the first control module comprises:
a first switching device coupled through a relay to the primary winding at the tap terminal and operable to be turned on and off to cause current to flow through the primary winding; and
a first controller for controlling the first switching device when the input voltage has a magnitude within the low voltage range; and
the second control modules comprises:
a second switching device coupled to the primary winding at the end terminal and operable to be turned on and off to cause current to flow through the primary winding; and a second controller for controlling the second switching device when the input voltage has a magnitude within the high voltage range.

15. The method of claim 13 comprising determining if the magnitude of the input voltage is within the high voltage range or the low voltage range.

16. The method of claim 13 comprising comparing the magnitude of the input voltage against a predetermined value.

17. The method of claim 13 wherein the input voltage is an AC voltage.

18. The method of claim 13 comprising:
providing a first feedback signal to the first control module; and
providing a second feedback signal to the second control module.

19. The method of claim 13 wherein the input voltage can be an AC mains voltage or an automotive voltage.

20. The method of claim 14 wherein:
operating the power converter system with the first control module comprises turning the first switching device on and off to cause current to flow through the primary winding; and
operating the power converter system with the second control module comprises turning the second switching device on and off to cause current to flow through the primary winding.

21. The method of claim 14 wherein:
operating the power converter system with the first control module comprises controlling the first switching device with the first controller to cause current to flow through the primary winding; and
operating the power converter system with the second control module comprises turning the second switching device with the second controller to cause current to flow through the primary winding.

22. The method of claim 17 comprising rectifying the AC voltage to provide a DC line voltage.

23. A power converter system comprising:
an input terminal for an input voltage;
a transformer coupled to the input terminal, the transformer having a primary winding and a secondary winding;
an output terminal coupled to the secondary winding at which power is delivered to a load of the power converter system;
a first control module coupled through a relay to a tap terminal to the primary winding of the transformer, the first control module for operating the power converter system if a magnitude of the input voltage is within a low voltage range; and
a second control module coupled at an end terminal of the primary winding of the transformer, the second control module for operating the power converter system if a magnitude of the input voltage is within a high voltage range.

24. The power converter system of claim 23 wherein at least one of the first and second control modules comprises:
a switching device coupled to the primary winding and operable to be turned on and off to cause current to flow through the primary winding;
a controller for controlling the switching device when the input voltage has a magnitude within the respective voltage range.

25. The power converter system of claim 23 wherein at least one of the first control module and the second control module is implemented on an integrated circuit device.

26. The power converter system of claim 23 wherein the first control module is implemented on a first integrated circuit device and the second control module is implemented on a second integrated circuit device.

27. The power converter system of claim 23 comprising an input voltage sensing module operable to output at least one control signal for selecting the first control module or the second control module.

28. The power converter system of claim 23 wherein the input voltage is an AC voltage.

29. The power converter system of claim 23 comprising:
a first feedback loop for providing a first feedback signal to the first control module; and
a second feedback loop for providing a second feedback signal to the second control module.

30. The power converter system of claim 23 wherein the input voltage can be an AC mains voltage or an automotive voltage.

31. The power converter system of claim 27 wherein the input voltage sensing module comprises a microcontroller.

32. The power converter system of claim 27 wherein the input voltage sensing module comprises a comparator for comparing the magnitude of the input voltage against a predetermined value.

33. The power converter system of claim 28 comprising a rectifier circuit for rectifying the AC voltage to provide a DC line voltage.

* * * * *